United States Patent Office 3,776,938
Patented Dec. 4, 1973

3,776,938
DIHYDRO-PGE₁
Sune Bergstrom and Jan Sjovall, both of Kemiska Institutionen, Karolinska Institutet, Stockholm 60, Sweden
No Drawing. Continuation-in-part of application Ser. No. 203,752, June 20, 1962, now Patent No. 3,598,858, which is a continuation-in-part of abandoned application Ser. No. 199,209, Apr. 9, 1962, which in turn is a continuation-in-part of application Ser. No. 738,514, May 28, 1958, now Patent No. 3,069,322. This application Feb. 12, 1971, Ser. No. 115,109
Int. Cl. C07c 61/36
U.S. Cl. 260—468 D    4 Claims

ABSTRACT OF THE DISCLOSURE

The prostaglandins dihydro-PGE₁ and dihydro-PGF₁α, and their salts and esters are disclosed. These novel compounds are useful for a variety of pharmacological purposes, including use as smooth muscle stimulants and as cardiovascular agents.

CROSS-REFERENCE TO RELATED APPLICATIONS

This application is a continuation-in-part of our copending application Ser. No. 203,752, filed June 20, 1962, now Pat. No. 3,598,858, which is a continuation-in-part of our copending application Ser. No. 199,209, filed Apr. 9, 1962, now abandoned, which is a continuation-in-part of our copending application Ser. No. 738,514, filed May 28, 1958, now Pat. No. 3,069,322.

DESCRIPTION OF THE INVENTION

This invention relates to novel compositions of matter, and is more specifically concerned with novel organic compounds of the formula:

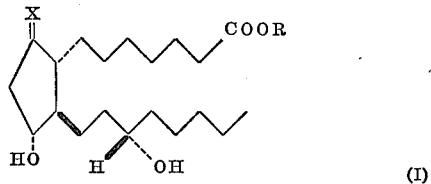

wherein R is hydrogen or hydrocarbyl of not more than 13 carbon atoms, and wherein X is =O or

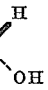

and pharmacologically acceptable salts thereof when R is hydrogen. Included in Formula I are acids, esters, and salts of the formulas:

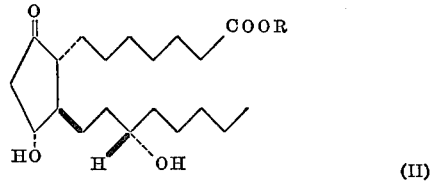

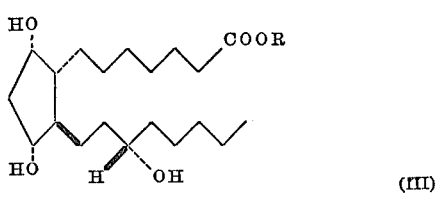

wherein R is as defined above.

Molecules of the compounds encompassed by Formulas I, II, and III each have several centers of asymmetry. Formulas I, II, and III are intended to represent optically active compounds each with the same absolute configuration as optically active prostaglandin E (PGE), later named prostaglandin E₁ (PGE₁), and obtained from certain mammalian tissues, for example, sheep vesicular glands. See our said Pat. No. 3,069,322. See also later publications, for example, Bergstrom et al., J. Biol. Chem. 238, 3555 (1963), Bergstrom et al., Pharmacol. Rev. 20, 1 (1968), and references cited in those.

In Formulas I, II, and III, a broken line attachment to the cyclopentane ring indicates a chain or group in alpha configuration, i.e., below the plane of the cyclopentane ring. A heavy solid line attachment to the cyclopentane ring indicates a chain in beta configuration, i.e., above the plane of the cyclopentane ring. The configuration of the side chain hydroxy in Formulas I, II, and III is S.

A systematic name for the compound of Formula II wherein R is hydrogen is 3α-hydroxy-2β-[(3S)-3-hydroxyoctyl]-5-oxo-1α-cyclopentaneheptanoic acid. For convenience, the compound is designated dihydro-PGE₁.

A systematic name for the compound of Formula III wherein R is hydrogen is 3α,5α-dihydroxy-2β-[(3S)-3-hydroxyoctyl]-1α-cyclopentaneheptanoic acid. For convenience, this compound is designated dihydro-PGF₁α.

Dihydro-PGE₁ and dihydro-PGF₁α were previously named dihydro-PGE and dihydro-PGF, respectively. See our said Pat. No. 3,069,322.

With regard to Formulas I, II, and III, examples of hydrocarbyl of not more than 13 carbon atoms are alkyl, e.g., methyl, propyl, hexyl, decyl; cycloalkyl, e.g., cyclopropyl, 2-butylcyclopropyl, cyclobutyl, cyclobutylmethyl, 3-pentylcyclobutyl, 2,2-dimethylcyclobutyl, cyclopentyl, 3-tert-butylcyclopentyl, 2-cyclopentylethyl, cyclohexyl, cyclohexylmethyl; aralkyl, e.g., benzyl, phenethyl, 1-phenylethyl, 2-phenylpropyl, 3-phenylbutyl, 2-(1-naphthylethyl), benzhydryl; aryl, e.g., phenyl, p-tolyl, p-ethylphenyl, p-tert-butylphenyl, 1-naphthyl; and such unsaturated moieties as allyl, crotyl, and propargyl.

The novel compounds of Formulas I, II, and III, i.e., dihydro-PGE₁, dihydro-PGF₁α, and their salts and esters, are extremely potent in causing stimulation of smooth muscle as shown, for example by tests on strips of guinea pig ileum, rabbit duodenum, or gerbil colon. These compounds are also highly active in potentiating other known smooth muscle stimulators, for example, oxytocic agents, e.g., oxytocin and the various ergot alkaloids including derivatives and analogs thereof. Accordingly, these novel Formula I, II, and III compounds are useful in place of or in combination with less than the usual amounts of these and other known smooth muscle stimulators whenever smooth muscle stimulation is needed to alleviate or prevent some physiological condition in mammals, including humans, useful domestic animals, pets, zoological specimens, and laboratory animals, for example, mice, rabbits, rats, and monkeys. For example, these compounds can be used to alleviate or prevent conditions of gastrointestinal atony in mammals, including humans, e.g., paralytic iteus following anesthesia and surgical operation or from other medical causes. For this purpose, the compound is administered parenterally, e.g., subcutaneously, intramuscularly or by intravenous injection or infusion in a dose range 0.1 to 2 mg. per kg. of body weight per day, the exact dose depending on the age, weight, and condition of the patient or animals, and the frequency and route of administration. Small repeated doses are indicated when the aim is to prevent rather than alleviate the atony.

Another smooth muscle stimulatory area where these novel Formula I, II, and III compounds are useful, especially those of Formula II, is in the control or prevention of atonic uterine bleeding in mammals after abortion or delivery, to aid in the expulsion of the placenta, and during the puerperium. For this purpose, the compound is administered by intravenous infusion immediately after abortion or delivery at a dose in the range about 0.1 to about 100 μg. per kg. of body weight per minute until the desired effect is obtained. Subsequent doses are given by intraveous, subcutaneous, or intramuscular injection or infusion during puerperium in the range 0.1 to 2 mg. per kg. of body weight per day, again the exact dose depending on the age, weight, and condition of the patient or animal.

In still another smooth muscle stimulatory area, these novel compounds of Formulas I, II, and III are surprisingly useful in place of oxytocin to induce labor in pregnant female animals, including man, cows, sheep, and pigs, at or near term, or in pregnant animals with intrauterine death of the fetus from about 20 weeks to term. For this purpose, the compound is infused intravaneously at a dose of 0.1 to 100 μg. per kg of body weight per minute until at or near the termination of the second stage of labor, i.e., expulsion of the fetus. These compounds are especially useful when the female is one or more weeks post-mature and natural labor has not started, or 12 to 60 hours after the membranes have ruptured and natural labor has not yet started. An alternative route of administration is oral.

The novel compounds of Formulas I, II, and III are also useful for controlling the reproductive cycle in ovulating female mammals, including humans and animals such as monkeys, rats, rabbits, dogs, cattle, and the like. By the term ovulating female mammals is meant animals which are mature enough to ovulate but not so old that regular ovulation has ceased. For that purpose, dihydro-$PGE_1$, for example, is administered systemically at a dose level in the range 0.1 mg. to about 20 mg. per kg. of body weight of the female mammal, advantageously during a span of time starting approximately at the time of ovulation and ending approximately at the time of menses or just prior to menses. Intravaginal and intrauterine are alternative routes of administration. Additionally, expulsion of an embryo or a fetus is accomplished by similar administration of the compound during the first third of the normal mammalian gestation period.

The novel compounds of Formulas I, II, and III, especially those of Formula II, are also useful in mammals, including man, as nasal decongestants. For this purpose, the compounds are used in a dose range of about 10 μg. to about 10 mg. per ml. of a pharmacologically suitable liquid vehicle or as an aerosol spray, both for topical application.

The novel compounds of Formula II are useful in mammals, including man and useful animals, e.g., dogs and pigs, to reduce the control excessive gastric secretion, thereby reducing or avoiding gastrointestinal ulcer formation, and accelerating the healing of such ulcers already present in the gastrointestinal tract. For this purpose, the compounds are injected or infused intravenously, subcutaneously, or intramuscularly in an infusion dose range about 1 μg. to about 100 μg. per kg. of body weight per minute, or in a total daily dose by injection or infusion in the range about one to about 50 mg. per kg. of body weight per day, the exact dose depending upon the age, weight, and condition of the patient or animal, and on the frequency and route of administration.

The novel Formula II compounds lower systemic arterial blood pressure in anesthetized (pentobarbital sodium) pentolinium-treated rats with indwelling aortic and right heart cannulas. Accordingly, these novel compounds are useful as hypotensive agents to reduce blood pressure in mammals, including man. For this purpose, the compounds are administered by intravenous infusion at the rate about 0.1 to about 100 μg. per kg. of body weight per minute, or in single or multiple doses of about 100 μg. to 5 mg. per kg. of body weight total per day.

The novel Formula I, II, and III compounds of this invention are used for the purposes described above in the free acid form, in ester form, or in pharmacologically acceptable salt form. When the ester form is used, the ester is any of those within the above definition of R. However, it is preferred that the R moiety not contain olefinic or acetylenic unsaturation. More preferred are alkyl esters wherein the alkyl moiety contains one to 8 carbon atoms, inclusive. Especially preferred are alkyl of one to 4 carbon atoms, inclusive. Of course alkyl, methyl and ethyl are especially preferred for optimum absorption of the compound by the body or experimental animal system.

Examples of alkyl of one to 4 carbon atoms are methyl, ethyl, propyl, isopropyl, butyl, isobutyl, sec-butyl and tert-butyl. Examples of alkyl of one to 8 carbon atoms are those mentioned above, and also pentyl, hexyl, heptyl, octyl, and branched chain isomers thereof, e.g., 2-ethylhexyl.

Pharmacologically acceptable salts of these Formula I, II, and III compounds wherein R is hydrogen useful for the purposes described above are those with pharmacologically acceptable metal cations, ammonium, amine cations, or quaternary ammonium cations.

Especially preferred metal cations are those derived from the alkali metals, e.g., lithium, sodium and potassium, and from the alkaline earth metals, e.g., magnesium and calcium, although cationic forms of other metals, e.g., aluminium, zinc, and iron, are within the scope of this invention.

Pharmacologically acceptable amine cations are those derived from primary, secondary, or tertiary amines. Examples of suitable amines are methylamine, dimethylamine, trimethylamine, ethylamine, dibutylamine, triisopropylamine, N-methylhexylamine, decylamine, dodecylamine, allylamine, crotylamine, cyclopentylamine, dicyclohexylamine, benzylamine, dibenzylamine, α-phenylethylamine, β-phenylethylamine, ethylenediamine, diethylenetriamine, and like aliphatic, cycloaliphatic, and araliphatic amines containing up to and including about 18 carbon atoms, as well as heterocyclic amines, e.g., piperidine, morpholine, pyrrolidine, piperazine, and lower-alkyl derivatives thereof, e.g., 1-methylpiperidine, 4-ethylmorpholine, 1 - isopropylpyrrolidine, 2-methylpiperidine, 1,4-dimethylpiperazine, 2-methylpiperidine, and the like, as well as amines containing water-solubilizing or hydrophilic groups, e.g., mono-, di-, and triethanolamine, ethyldiethanolamine, N-butylethanolamine, 2-amino-1-butanol, 2-amino-2-ethyl-1,3-propanediol, 2-amino-2-methyl-1-propanol, tris(hydroxymethyl)aminomethane, N-phenylethanolamine, N-(p-tert-amylphenyl)diethanolamine, galactamine, N-methylglucamine, N-methylglucosamine, ephedrine, phenylephrine, epinephrine, procaine, and the like.

Examples of suitable pharmacologically acceptable quaternary ammonium cations are tetramethylammonium, tetraethylammonium, benzyltrimethylammonium, phenyltriethylammonium, and the like.

When the novel Formula I, II, and III compounds are used for intravenous injection or infusion, sterile aqueous isotonic solutions are preferred. For that purpose, it is preferred because of increased water solubility that R in Formula I, II, and III be hydrogen or a pharmacologically acceptable cation. For subcutaneous or intramuscular injection, sterile solutions or suspensions of the acid, salt, or ester in aqueous or non-aqueous media are used. Tablets, capsules, and liquid preparations such as syrups, elixirs, and simple solutions, with the usual pharmaceutical carriers, are used for oral or sublingual administration. For rectal, vaginal, or intrauterine administration, suppositories, lavage and douche preparations, and solutions as such or contained in a sponge, all prepared by methods known in the art, are used. Additional pharmaceutical preparations containing these novel compounds are described in our said Patent No. 3,069,322.

Dihydro-$PGE_1$ (Formula II, R=H) and dihydro-$PGF_{1\alpha}$ (Formula III, R=H) are prepared by catalytic hydrogenation of the compounds known as PGE₁ and PGF₁ₐ, respectively. Similarly, the esters of dihydro-PGE₁ and dihydro-PGF₁ₐ are prepared by catalytic hydrogenation of the corresponding esters of PGE₁ and PGF₁ₐ, respectively. The structural formulas of these PGE₁ (IV) and PGF₁ₐ (V) reactants are now known to be as follows:

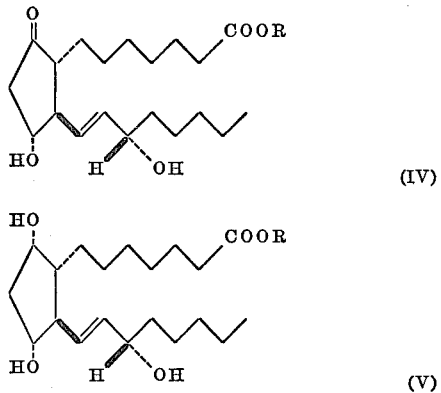

wherein R is as defined above.

These PGE₁ and PGF₁ₐ acid and ester reactants are prepared as described in our said Patent No. 3,069,322.

The catalytic hydrogenation is carried out by methods known in the art for saturating olefinic compounds. Since the Formula IV reactants are sensitive to acid and base, it is preferred for those that the hydrogenation medium be neutral or only slightly acidic. Suitable hydrogenation catalysts are those containing platinum or palladium alone or on an inert carrier. Especially preferred catalysts are the finely divided platinum metal obtained by prior or simultaneous hydrogenation of the platinum oxide known as Adams' Catalyst (Org. Syn. Coll. vol. I, 463 (1941)), or finely divided palladium metal supported on a carbon carrier, advantageously containing about 5 percent palladium by weight. Another useful catalyst for this purpose is rhodium metal (5%) on alumina. Suitable liquid hydrogenation diluents are ethanol, ethanol containing a small percentage of acetic acid, i.e., about one to about 15 percent by volume of acetic acid, dioxane, and ethyl acetate. Hydrogenation pressures ranging from about atmospheric to about 50 p.s.i., and hydrogenation temperatures ranging from about 10° to about 100° C. are preferred. The hydrogenation process is stopped after absorption of one equivalent of hydrogen, and the resulting dihydro product is isolated from the reaction mixture by conventional methods, for example, removal of the catalyst by filtration or centrifugation, followed by evaporation of the liquid diluent.

This hydrogenation will also saturate any olefinic or acetylenic unsaturation present in the hydrocarbyl portion of a Formula IV or V reactant ester. Enough additional hydrogen should be used to saturate those other double and triple bonds to insure complete saturation of the double bonds in the prostaglandin side chains. If a Formula II or III ester with an olefinic or acetylenic R moiety is desired, that is made by esterification of the dihydro-PGE₁ or dihydro-PGF₁ₐ acid.

Alternative reactants for the preparation of the novel Formula II compounds are the prostaglandins known as PGE₂ and PGE₃ and their corresponding esters. Alternative reactants for the preparation of the novel Formula III compounds are the prostaglandins known as PGF₂ₐ and PGF₃ₐ and their corresponding esters. These alternative prostaglandin reactants and their esters are prepared as described in our said copending application Ser. No. 203,752. These reactants and their esters are transformed to the corresponding Formula II and III acids and esters by catalytic hydrogenation as described above for the PGE₁ and PGF₁ₐ reactants. However, PGE₂ and PGF₂ₐ each contain two olefinic double bonds while PGE₃ and PGF₃ₐ each contain three olefinic double bonds. Therefore the PGE₂ and PGF₂ₐ reactants need two quivalents of hydrogen and the PGE₃ and PGF₃ₐ reactants need three equivalents of hydrogen, each for transformation to the desired dihydro-PGE₁ and dihydro-PGF₁ₐ product.

An alternative method for the production of dihydro-PGF₁ₐ and its esters comprises reacting dihydro-PGE₁ or its esters with sodium borohydride whereby the ring carbonyl group of the dihydro-PGE₁ is reduced to a secondary hydroxy group. This reaction gives a mixture of two isomeric secondary alcohols, one being the desired dihydro-PGE₁ₐ and the other being designated dihydro-PGF₁ᵦ. The latter compound has the structural formula:

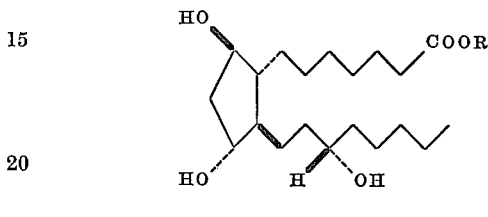

wherein R is as defined above.

For this carbonyl reduction, a cold methanol solution or suspension of about three parts by weight of sodium borohydride is added to a cold solution of each part by weight of the dihydro-PGE₁ or its ester in cold methanol. The mixture is maintained cold for about 10 to 60 minutes, and is then maintained at about 25° C. for about one to two hours. The resulting mixture of dihydro-PGF₁ₐ and dihydro-PGF₁ᵦ or their esters is then isolated and separated into its components by chromatography as described hereinafter. Suitable amounts of methanol are about 100 ml. for each gram of the diyhdro-PGE₁ reactant and about 100 ml. for each gram of the sodium borohydride. A suitable cold temperature is about 0° C.

When dihydro-PGE₁ (Formula II, R=H) or dihydro-PGF₁ₐ (Formula III, R=H) has been prepared by hydrogenation of a PGE or PGFₐ acid, or when dihydro-PGF₁ₐ has been prepared by carbonyl reduction of dihydro-PGE₁, and a hydrocarbyl ester is desired for one of the above-described pharmacological purposes, those acids are esterified by procedures known in the art. In the case of dihydro-PGE₁, neutral esterifications are desirable since the acid is sensitive to acid and base. Illustratively, the alkyl esters are prepared by reaction of the acid, dihydro-PGE₁ or dihydro-PGF₁ₐ, with the appropriate diazohydrocarbon. For example, when diazomethane is used, the methyl esters are produced. Similar use of diazoethane, diazobutane, and 1-diazo-2-ethylhexane, for example, gives the ethyl, butyl, and 2-ethylhexyl esters, respectively.

Esterification with diazohydrocarbons is carried out by mixing a solution of the diazohydrocarbon in a suitable inert solvent, preferably diethyl ether, with the acid reactant, advantageously in the same or a different inert diluent. After the esterification reaction is complete, the solvent is removed by evaporation, and the ester purified if desired by conventional methods, preferably by chromatography. It is preferred that contact of the acid reactants with the diazohydrocarbon are no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley & Sons, Inc., New York, N.Y., vol. 8, pp. 839–394 (1954).

An alternative method for esterification of the carboxyl moiety of dihydro-PGE₁ or dihydro-PGF₁ₐ comprises transformation of the free acid to the corresponding silver salt, followed by interaction of the salt with an alkyl iodide. Examples of suitable iodides are methyl iodide, ethyl iodide, butyl iodide, isobutyl iodide, tert-butyl iodide, and the like. The silver salts are prepared by conventional methods, for example, by dissolving the acid in cold dilute aqueous ammonia, evaporating the excess ammonia at reduced pressure, and then adding the stoichiometric amount of silver nitrate.

The novel Formula I, II, and III free acids are transformed to pharmacologically acceptable salts by neutralization with appropriate amounts of the correpsonding inorganic or organic base, examples of which correspond to the cations and amines listed above. These transformations are carried out by a variety of procedures known in the art to be generally useful for the preparation of inorganic, i.e., metal or ammonium, salts, amine acid addition salts, and quaternary ammonium salts. The choice of procedure depends in part upon the solubility characteristics of the particular salt to be prepared. In the case of the inorganic salts, it is usually suitable to dissolve the acid in water containing the stoichiometric amount of a hydroxide, carbonate, or bicarbonate correpsonding to the inorganic salt desired. For example, such use of sodium hydroxide, sodium carbonate, or sodium bicarbonate gives a solution of the sodium salt of the prostanoic acid derivative. Evaporation of the water or addition of a water-miscible solvent of moderate polarity, for example, a lower alkanol or a lower alkanone, gives the solid inorganic salt if that form is desired.

To produce an amine salt, the acid is dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it is usually obtained in solid form by addition of a miscible diluent of low polarity or by evaportion. If the amine is relatively volatile, any excess can easily be removed by evaporation. It is preferred to use stoichiometric amounts of the less volatile amines.

Salts wherein the cation is quaternary ammonium are produced by mixing the acid with the stoichiometric amount of the corresponding quaternary ammonium hydroxide in water solution, followed by evaporation of the water.

The invention can be more fully understood by the following examples.

EXAMPLE 1—DIHYDRO-PGE$_1$

An active platinum catalyst is prepared by suspending 0.2 mg. of PtO$_2$ in 1.0 ml. of ethanol containing 10 percent by volume of acetic acid and reducing with hydrogen at near atmospheric pressure and about room temperature. After pre-reduction of the catalyst, 1 mg. of PGE$_1$ is added and the hydrogenation continued until essentially one equivalent of hydrogen is absorbed. The catalyst is removed by centrifugation and washed thoroughly with ethanol. The combined organic solvents are evaporated under reduced pressure below 50° C. to afford a residue of dihydro-PGE$_1$. This material is further purified, if desired, by paper chromatography using acetic acid-water (70:30) as stationary phase and ethylene chloride-heptane (1:1) as mobile phase as described for PGE$_1$ in Acta Chem. Scand. 14, 1693 (1960). For larger samples, further purification is accomplished, if desired, by reversed phase partition chromatography using hydrophobic diatomite (kieselguhr treated with chloromethylsilane). For example, 4 ml. of the lower phase of an isooctanol:chloroform:methanol:water system (1:1:10:10)

supported on 4.5 g. of said hydrophobic diatomite is sufficient for purification of 100 mg. of the dihydro-PGE$_1$, the latter being dissolved in 3 to 5 ml. of the upper phase of said system, the solution being applied to the column, and the column then being eluated with additional of said upper phase. The desired dihydro-PGE$_1$ is located in eluates by spotting filter paper with a drop of eluate, and then spraying the paper by phosphomolybdic acid spray. This procedure is also used to locate this compound on the paper chromatograms.

Following the procedure of Example 1 but using additional hydrogen, PGE$_2$ and PGE$_3$ are hydrogenated to give dihydro-PGE$_1$. Also following the procedure of Example 1, dihydro-PGF$_{1\alpha}$ is prepared by hydrogenating PGF$_{1\alpha}$, PGF$_{2\alpha}$, or PGF$_{3\alpha}$. Also following the procedure of Example 1, the methyl, ethyl, 2-ethylhexyl, cyclohexyl, and benzyl esters of PGE$_1$ and PGF$_{1\alpha}$ are hydrogenated respectively to the corresponding esters of dihydro-PGE$_1$ and dihydro-PGF$_{1\alpha}$.

EXAMPLE 2—DIHYDRO-PGE$_1$

A solution of 0.14 g. of PGE$_1$ in 10 ml. of 95% ethanol is hydrogenated at atmospheric pressure using about 50 mg. of 5% rhodium-on-alumina catalyst. When hydrogen uptake has ceased, the reaction mixture is filtered and the filtrate is evaporated to give a residue (0.13 g.). This residue is chromatographed over 13 g. of acid-washed silica gel wet-packed in 50% benzene-ethyl acetate, eluting with 60 ml. of 50%, 75 ml. of 75% ethyl acetate in benzene and finally 90 ml. of ethyl acetate taking 15-ml. fractions. Fractions 7–12 are combined and evaporated to give 0.10 g. of dihydro-PGE$_1$ as a colorless gum; infrared absorption: (methylene chloride solution) principal peaks at 3350, 1745, 1720, 1240, 1160, 1120, and 1060 cm.$^{-1}$.

EXAMPLE 3—DIHYDRO-PGE$_1$ METHYL ESTER

A solution of 230 mg. of PGE$_1$ methyl ester in 20 ml. of 95% ethanol is hydrogenated at atmospheric pressure using 25 mg. of 5% rhodium-on-alumina catalyst. When hydrogen uptake has ceased (about 45 min.), the mixture is filtered and the catalyst is washed with methanol. The filtrate and washings are combined and evaporated under reduced pressure. The residue is chromatographed over 30 g. of silica gel, wet-packed in 20% ethyl acetate in cyclohexane, eluting with 125 ml. of 20%, 125 ml. of 40%, 125 ml. of 60%, 125 ml. of 80% ethyl acetate in cyclohexane, and then with 100 ml. of ethyl acetate, taking 25-ml. fractions. Fractions 19–25 are combined and evaporated to give 154 mg. of dihydro-PGE$_1$ methyl ester; infrared absorption: (methylene chloride solution) principal peaks at 3350, 1745, 1225, 1205, 1175, 1120, 1070 and 1015 cm.$^{-1}$.

EXAMPLE 4—DIHYDRO-PGF$_{1\alpha}$

A solution of 15 mg. of PGF$_{1\alpha}$ in 10 ml. of 95% ethanol is hydrogenated at atmospheric pressure using 10 mg. of 5% rhodium-on-alumina catalyst. When hydrogen uptake has ceased, the reaction mixture is filtered and the catalyst is washed with 95% ethanol. The filtrate and washings are combined and evaporated under reduced pressure. The residue (13 mg.) is dissolved in acetone and applied across two 10 x 20 cm. silica gel G thin layer chromatographic plates. The plates are developed with 20:20:1 benzene-dioxane-acetic acid. When the front is 2 cm. from the top of the plates the plates are removed and air-dried. Brief exposure of the plates to iodine vapors shows 3 zones. The plates are dried at 50° C. under reduced pressure to remove iodine, and the most polar zone is removed and eluted with four 5-ml. portions of methanol. The methanol solutions are combined, filtered, and evaporated. The residue is dissolved in 0.5 ml. of methanol, about 3 ml. of water is added, and the mixture is acidified with dilute HCl to between pH 2 and 3. The acidified mixture is extracted with three 5-ml. portions of methylene chloride, and the extracts are dried over sodium sulfate and evaporated to give 10.7 mg. of dihydro-PGF$_{1\alpha}$ as a viscous oil; N.M.R. peaks at 3.6, 3.9 and 4.2$\delta$.

EXAMPLE 5—DIHYDRO-PGE$_1$ METHYL ESTER

To a dry ether solution of one milligram (2.8 micromoles) of dihydro-PGE$_1$ is added a slight excess of diazomethane, prepared in ether from four micromoles of nitrosomethylurethane. The reaction mixture is allowed to stand for about five minutes, and the ether and excess diazomethane distilled off. On distillation to dryness, dihydro-PGE$_1$ methyl ester is obtained with substantially the same physical properties as the product of Example 3.

Following the procedure of Example 5, dihydro-PGF$_{1\alpha}$ is transformed to dihydro-PGF$_{1\alpha}$ methyl ester. Also following the procedure of Example 5 but using in place of the diazomethane, diazoethane, 1-diazo-2-ethylhexane, cyclohexyldiazomethane, and phenyldiazomethane, there are obtained the ethyl, 2-ethylhexyl, cyclohexylmethyl, and benzyl esters of dihydro-PGE$_1$ and dihydro-PGF$_{1\alpha}$.

EXAMPLE 6—DIHYDRO-PGE$_1$ ETHYL ESTER

A solution of 0.300 g. of PGE$_1$ in 50 ml. of ethanol is hydrogenated at atmospheric pressure using 5% rhodium-on-alumina as catalyst. When hydrogen uptake has ceased, the reaction mixture is filtered to remove the catalyst and the filtrate is cooled in an ice bath. An ethereal solution of diazoethane prepared from 1.5 g. of N-ethyl-N-nitrosourea, 20 ml. of ether and 4 ml. of 40% potassium hydroxide is added dropwise until a yellow color persists. Then, the solution is stirred for 15 minutes and the solvent is removed by evaporation under reduced pressure. The residue is dissolved in 20 ml. of methylene chloride and chromatographed over silica gel, eluting with 50% ethyl acetate in cyclohexane. The eluates are combined and evaporated to give 0.298 g. of dihyrdro-PGE$_1$ ethyl ester; NMR peaks at 54 (triplet), 75 (triplet), 81, 135, 214 and 245 (quartet) cps.; principal I.R. absorption peaks at 1745, 3350, and 3520 cm.$^{-1}$.

EXAMPLE 7—DIHYDRO-PGF$_{1\alpha}$ METHYL ESTER

A solution of 60 mg. of dihydro-PGF$_{1\alpha}$ in a mixture of methylene chloride and methanol is treated with excess diazomethane in ether and allowed to stand 15 min. at room temperature (25° C.). The reaction mixture is then evaporated leaving dihydro-PGF$_{1\alpha}$ methyl ester as a clear gum; I.R. absorption (methylene chloride solution) principal peaks at 3400, 1740, 1200, 1175, 1110, 1075, 1025, and 825 cm.$^{-1}$.

What is claimed is:
1. A compound of the formula:

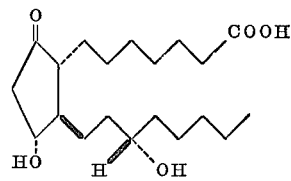

and pharmacologically acceptable salts thereof.

2. A compound of the formula:

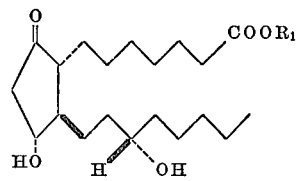

wherein R$_1$ is alkyl of one to 8 carbon atoms, inclusive.

3. A compound according to claim 2 wherein R$_1$ is methyl.

4. A compound according to claim 2 wherein R$_1$ is ethyl.

References Cited

UNITED STATES PATENTS 3,296,091  1/1967  Beal III et al. _____ 195—30

OTHER REFERENCES

Anggard II: Annals of the N.Y. Academy of Sciences 180, 260–217, 1971.
Anggard: Acta Physiol. Scand. 66, 509–510 (1960).
Southern: The Prostaglandins, pp. 31–36 (1972).

LORRAINE A. WEINBERGER, Primary Examiner

R. GERSTL, Assistant Examiner

U.S. Cl. X.R.

260—211 R, 247.2 R 268 R 293.65, 326.3, 429.9, 439 R, 448 R, 501.1, 501.15, 501.17, 501.2, 514 D

UNITED STATES PATENT OFFICE
CERTIFICATE OF CORRECTION

Patent No. 3,776,938      Dated December 4, 1973

Inventor(s) Sune Bergström and Jan Sjövall

It is certified that error appears in the above-identified patent and that said Letters Patent are hereby corrected as shown below:

Column 2, lines 59-60, "paralytic iteus" should read -- paralytic ileus --. Column 3, line 52, "to reduce the control" should read -- to reduce and control --. Column 4, line 8, "Of course alkyl," should read -- Of those alkyl, --; line 42, "1-isopropylpyrrolidine, 2-methylpiperidine," should read -- 1-isopropylpyrrolidine, 2-methylpyrrolidine, --. Column 6, line 1, "two quivalents" should read -- two equivalents --; lines 10-11, "the desired dihydro-$PGE_{1\alpha}$" should read -- the desired dihydro-$PGF_{1\alpha}$ --.

Signed and Sealed this fifth Day of July 1977

[SEAL]

Attest:

RUTH C. MASON
*Attesting Officer*

C. MARSHALL DANN
*Commissioner of Patents and Trademarks*